DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1046

T887,022
POST STABILIZATION BATH PROCESSING

Norman W. Kalenda, Kodak Park Works,
Rochester, N.Y. 14650

Filed Apr. 27, 1970, Ser. No. 32,440
Int. Cl. G03c *5/26, 5/28*
U.S. Cl. 96—61
No Drawing. 19 Pages Specification

Post-stabilization baths comprising from about 30 to about 80 percent by weight of a polyalkylene glycol, especially polyethylene glycol, having a molecular weight of at least about 1000, e.g. an aqueous methanol or ethanol solution, are utilized in the processing of exposed incorporated developer photographic silver halide elements to provide dry, stable prints and negatives with improved keeping properties and substantially free of antihalation pelloid dye stain. These baths are useful in stabilization processing. The post-stabilization bath can be, for example, an aqueous methanol solution of polyethylene glycol containing about 30 to about 80 percent by weight polyethylene glycol.